Feb. 22, 1944.                E. E. EICKMEYER ET AL                2,342,333
DISPENSING APPARATUS
Filed Sept. 23, 1940                    7 Sheets-Sheet 1

EARL E. EICKMEYER,
ANTHONY G. HORVATH,
BY Toulmin & Toulmin
Attorneys

Feb. 22, 1944.  E. E. EICKMEYER ET AL  2,342,333
DISPENSING APPARATUS
Filed Sept. 23, 1940  7 Sheets-Sheet 2

Inventors
EARL E. EICKMEYER,
ANTHONY G. HORVATH,
By Toulmin & Toulmin
Attorneys

Feb. 22, 1944.  E. E. EICKMEYER ET AL  2,342,333

DISPENSING APPARATUS

Filed Sept. 23, 1940   7 Sheets-Sheet 3

Fig. 3

Inventors
EARL E. EICKMEYER,
ANTHONY G. HORVATH,
By Toulmin & Toulmin
Attorneys

Feb. 22, 1944.   E. E. EICKMEYER ET AL   2,342,333
DISPENSING APPARATUS
Filed Sept. 23, 1940   7 Sheets-Sheet 6

Inventors
EARL E. EICKMEYER,
ANTHONY G. HORVATH,
BY Toulmin & Toulmin
Attorneys

Feb. 22, 1944.   E. E. EICKMEYER ET AL   2,342,333
DISPENSING APPARATUS
Filed Sept. 23, 1940    7 Sheets-Sheet 7

INVENTORS
EARL E. EICKMEYER,
ANTHONY G. HORVATH,
BY
ATTORNEYS

Patented Feb. 22, 1944

2,342,333

UNITED STATES PATENT OFFICE 2,342,333

DISPENSING APPARATUS

Earl E. Eickmeyer and Anthony G. Horvath, Dayton, Ohio, assignors to The Dayton Pump and Manufacturing Company, Dayton, Ohio, a corporation of Ohio Application September 23, 1940, Serial No. 357,888

7 Claims. (Cl. 221—95)

This invention relates to fuel dispensing apparatus, and particularly to fuel dispensing apparatus in the form of recording pumps particularly adapted for the protection, from fraud, of buyers of fuel dispensed therefrom.

An object of this invention is to insure that the pump indicator means shall be reset to zero reading after each dispensing operation by providing mechanism automatically operative, upon failure so to reset the indicator, to mask or obscure the indicator dial during a succeeding dispensing operation (without resetting of the indicator mechanism) to prevent the operator of the pump from seeing the dial, while carrying out that particular dispensing operation.

A pump of any conventional type is driven by a motor for pumping gasoline through a meter or equivalent mechanism which actuates an indicator.

As the gasoline or other fuel is delivered, the visual indicator wheels turn and indicate the gallons being delivered. Upon the completion of the delivery of the desired amount, the hose is re-hung on the hook which thereby opens the motor switch and stops the delivery of gasoline.

These and other objects and advantages will appear from the following description taken in connection with the drawings.

Formerly, in the operation of conventional fuel dispensing pumps, it was possible for the operator to begin a fuel dispensing operation without resetting the pump indicator to zero and thus to cause to be registered upon the pump indicator an amount in excess of the actual amount of fuel dispensed to the purchaser. This enabled the operator of the pump to charge the purchaser, fraudulent, for an amount of fuel in excess of the amount actually received by the purchaser.

In the present invention the mechanism is so connected to the shutter operating means that the shutters are placed over the indicator dials of the pump whenever a dispensing operation is begun without previously resetting the pump indicating mechanism to zero to thus prevent the pump operator from observing the dial and thus estimating the quantity delivered by the pump.

Figures 1, 19, 20, 21:
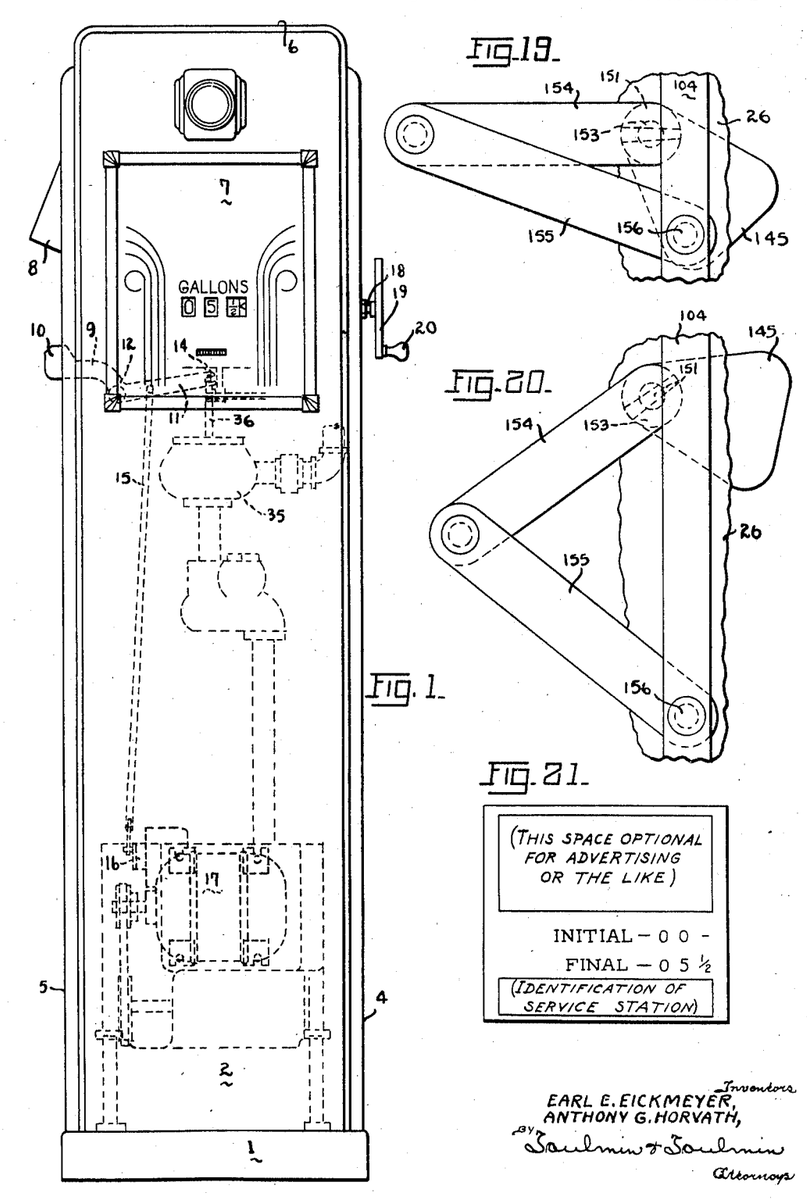
Figure 1 is a front view, in elevation, of a pump equipped according to the principles of this invention.
Figure 19 is a fragmentary view, in elevation, of a portion of the mechanism illustrated in Figure 2, with the parts in the starting position.
Figure 20 is a view similar to Figure 19, but showing the parts in the position taken after the hose hook has been manually raised for initiation of fuel delivery.
Figure 21 is a plan view of a receipt ticket as printed, severed, and issued by apparatus of this invention.

Referring to the drawings in detail, in Figure 1 we have shown a conventional form of motor operated pump with the principles of this invention applied to the indicator means and shutter operating means thereof. The details of the conventional internal structure of the pump are omitted in the interest of clearness. The casing of the illustrated pump comprises a pedestal 1 having extending inwardly upwardly therefrom a front side wall 2, a right side wall 4, and a left side wall 5 and a rear wall similar to the front.

The right and left side walls, 4 and 5, are preferably formed of the same sheet material which forms the top wall 6 therebetween, as shown in Figure 1. The front and rear walls are provided with window means 7 for viewing the front and rear dial plates during operation of the fluid dispensing pump. The front and rear dial plates are provided with suitable apertures which cooperate with numeral-carrying indicator drums for indicating the amount of fuel dispensed by the pump at a particular time during a dispensing operation and each dial plate is also provided with a grand total aperture cooperating with register means indicating the total gallonage dispensed by the pump.

In the form of pump illustrated, the hose outlet 8 extends outwardly from the left side of the pump casing and is adapted to have the pump hose screw-threadedly attached thereto. Adjacent the hose outlet 8, the left side of the casing is provided with an inwardly offset portion from which extends outwardly, through a suitable slot therein, the outer end 10 of the hose hook of hose hook lever 9, which is pivoted at 12 to a bracket or ear 13 extending inwardly from the left side wall 5 of the casing. The hose hook of hose hook lever 9 has the inner end portion thereof extending inwardly into the pump casing and provided with a forked inner extremity designated 14. The hose hook or hose hook lever 9 is thus swingably mounted in such manner that, when the hose nozzle is hung thereon, the inner forked extremity 14 thereof will be swung upwardly, and when the hose nozzle is removed from the outer end 10 of the hose hook lever 9, the outer end 10 thereof may be manually thrust upwardly to swing the inner extremity 14 thereof downwardly.

In order that the hose hook lever 9 shall control the starting and stopping of the pump, a link 15 has the upper end thereof pivotally secured to the inner end portion 11 of the lever 9 and the lower end thereof operatively secured in suitable manner to the control switch 16 of the pump operating motor 17. Thus, when the hose nozzle is hung upon the outer end 10 of the hose hook, the link 15 is drawn upwardly to open the motor switch 16 and stop the motor 17. Likewise, when the hose nozzle is removed from the outer end 10 of the hose hook of hose hook lever 9, the outer end 10 thereof may be manually thrust upwardly to thrust the link 15 downwardly to close the switch 16 and cause the pump operating motor 17 to be started.

Extending outwardly from the right side wall 4 of the pump casing is the rotatable resetting shaft 18 having the lever 19 rigidly secured at its outer end provided at one end with the handle 20. By operating the handle 20, the pump operator, subsequent to the completion of a dispensing operation, may rotate the shaft 18 to reset the indicator drums of the pump to the zero position.

Figure 2:
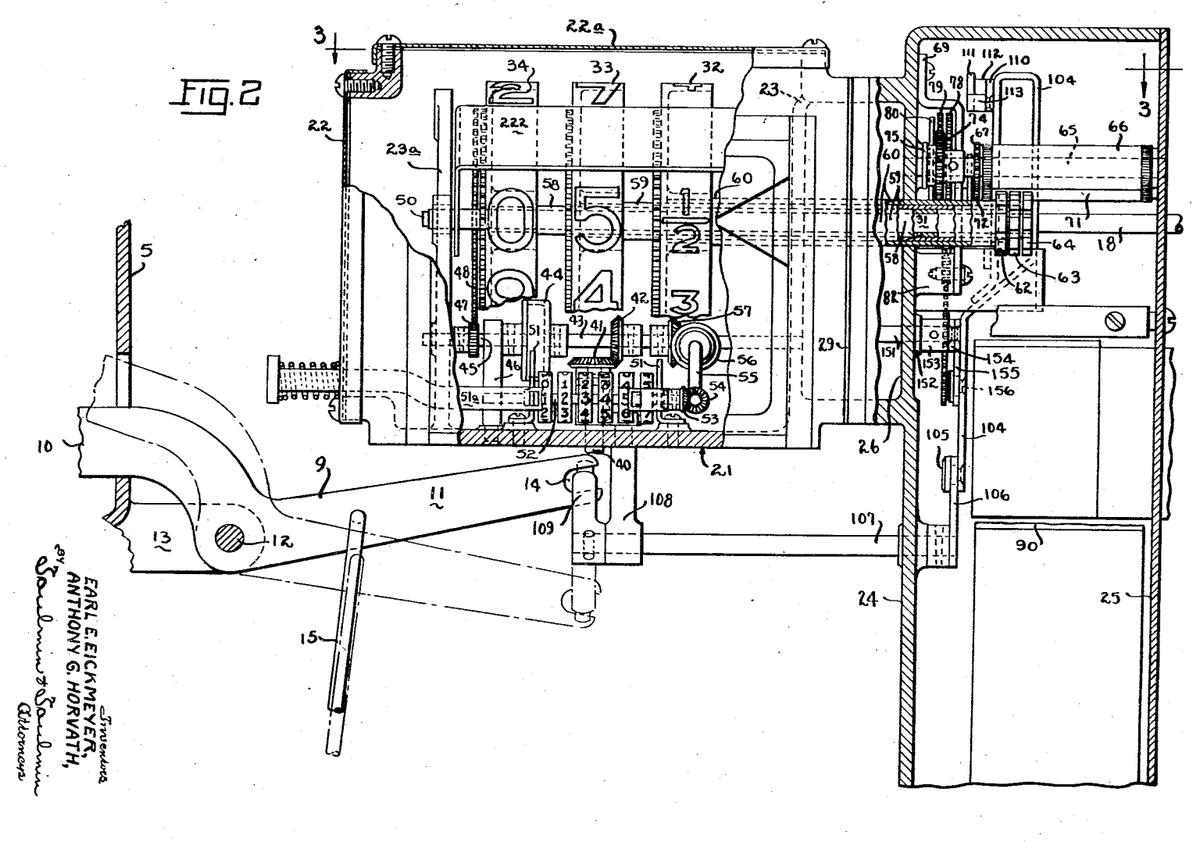
Figure 2 is a fragmentary enlarged detail view, partly in section, of a portion of the pump indicating and receipt ticket issuing mechanisms.
Figure 3:
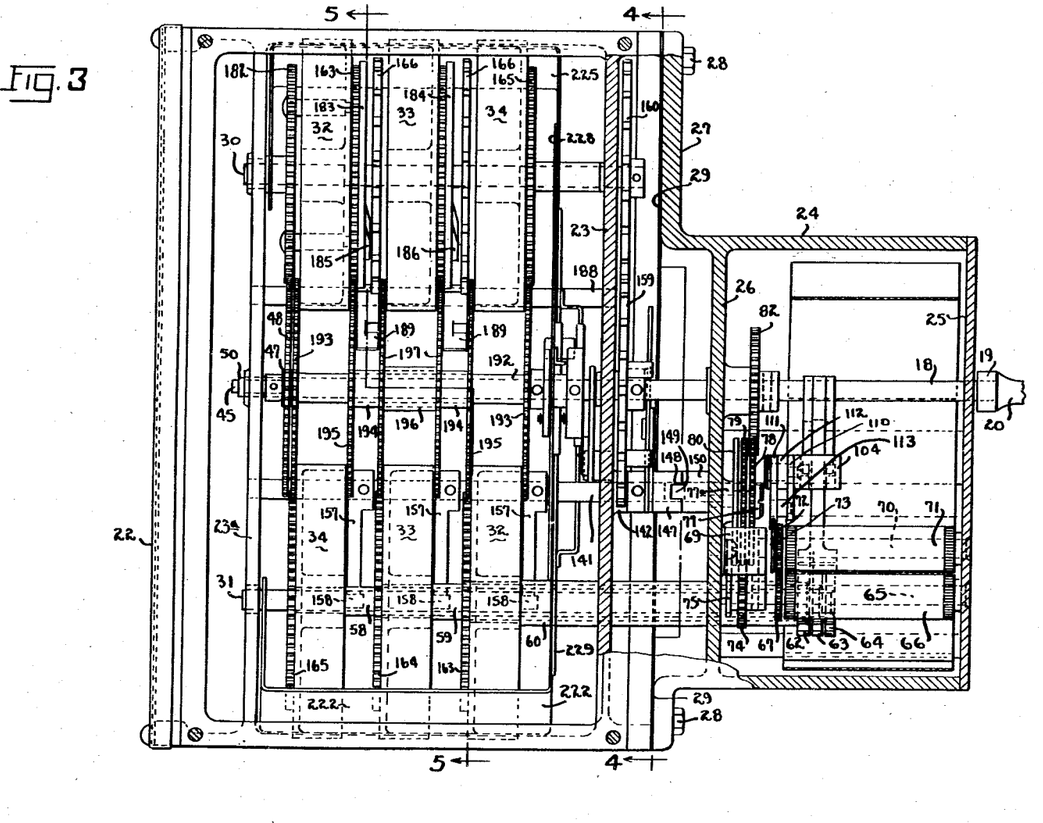
Figure 3 is a section taken on the line 3—3 of Figure 2.

Disposed between the spaced oppositely disposed dial plates in the pump casing is an indicator mechanism casing, generally designated 21. As shown in Figures 2 and 3, the plate 22 forms the inner end wall of the casing 21 which is disposed toward the left side wall 5 of the pump casing. The upper wall of the casing 21 is formed by a similar plate 22a. The plates 22 and 22a are secured to the body of the casing 21 by means of screws, as shown in Figure 2. At its right-hand end, the casing 21 has a vertical wall 23 formed integrally therein, and spaced inwardly of the casing from the right end portions of the walls thereof.

Rigidly secured in the pump casing to the right of the indicator casing 21 is the casing 24 which encloses the receipt ticket printing, severing and issuing means which comprises no part of this invention. At the right side, the casing 24 is closed by a cover plate 25 which is suitably secured to the top, bottom, and side walls thereof. Integrally formed with the top, bottom, and side walls of the casing 24 is the inner vertical wall 26 which is disposed in spaced relation and in parallelism with the wall 23 of the indicator casing 21.

Extending from the inner side wall of the casing 24 is the attaching flange 27 which is secured by means of bolts 28 (Fig. 3) to the right-hand end of the indicator casing 21, a suitable protective gasket 29 being disposed therebetween, as shown in Figures 2 and 3. A suitable aperture is provided in the right side wall 4 for providing access to the cover plate 25.

In the casing 21 disposed toward the left or inner end thereof, in inwardly spaced relation to the end plate 22 and in parallelism with the wall 23, is a wall 23a. Supported for rotation in the casing 21, at the rear side thereof by the walls 23 and 23a, is a shaft 30 which supports the rear bank of indicator drums, as shown in Figure 3. A similar shaft 31 is likewise supported for rotation at the forward side of the casing 21, and this shaft extends rightwardly into the casing 24, as shown in Figure 3, for a purpose which will hereinafter more clearly appear.

The drums 32 rotate simultaneously together, in synchronism, while the same relation is maintained between the drums 33 and between the drums 34 in order that the same amount may be registered by the dial plate at each side of the pump casing.

Figure 4:
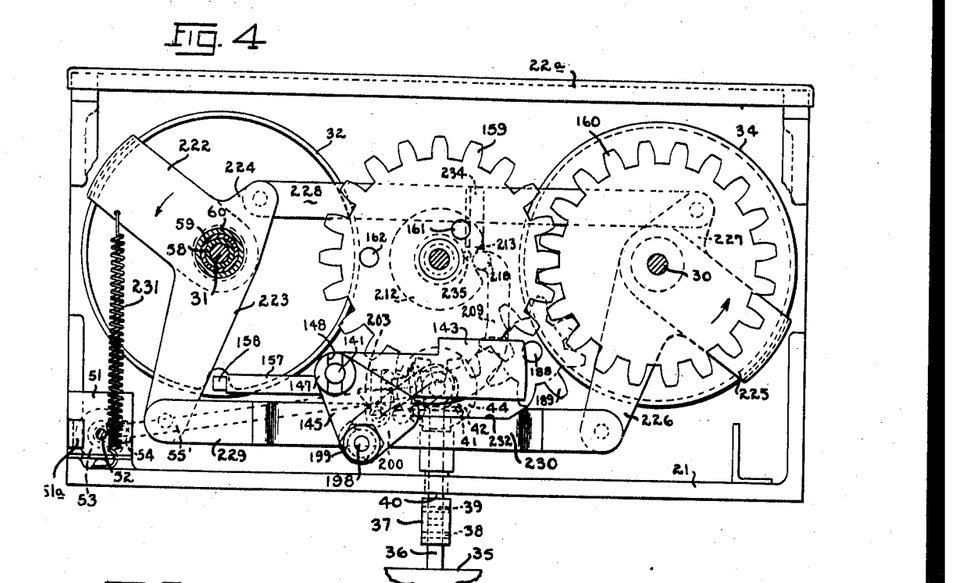
Figure 4 is a section taken substantially on the line 4—4 of Figure 3.

The meter mechanism of the pump is conventional and, as shown in Figure 4, the shaft 36 thereof has a tubular connector member 37 pinned thereto by means of the pin 38. This tubular connector member 37 is connected by means of the shear pin 39 to the shaft 40 which is thus driven directly from the meter 35. In case of obstruction or excessive binding in the indicator mechanism, the shear pin 39 will be severed, to break the drive connection between the shaft 36 of the meter and the shaft 40 and thus permit the meter 35 to operate independently of the indicator mechanism and prevent breakage, or other damage to the indicator mechanism.

Referring again to Figures 2 and 3, it will be seen that the shaft 40 extends vertically upwardly through the lower wall of the casing 21 and has rigidly secured to the upper end thereof the bevel gear 41. This bevel gear 41 meshes with the bevel gear 42 which is pinned to the shaft 43. The shaft 43 is suitably rotatably supported at the right end in the casing 21, and the left end thereof is supported by the overrunning clutch mechanism 44 secured to the end thereof.

Also connected to the overrunning clutch 44 is a shaft 45 which is rotatably supported by the wall 23a and the bracket 46 (Figure 2). Rigidly secured to the shaft 45 between the wall 23a and the bracket 46 is the pinion 47 which meshes with the gear 48. The gear 48 is rigidly secured to the left end of a shaft 50 which has one end rotatably supported in the wall 23a, while the other end thereof is supported by means and in a manner which will hereinafter more clearly appear. The gear 48, as hereinafter more clearly described, meshes with the drive gear of the rearmost indicator drum 32, as shown in Figure 3.

The means for transmitting the drive from the rearmost indicator drum 32 to the rearmost indicator drum 33, and from the rearmost indicator drum 33 to the rearmost indicator drum 34, as well as the drive between the forward and rear drums 32, the forward and rear drums 33 and the forward and rear drums 34 are also hereinafter most clearly described.

Also driven from the shaft 43 is the indicator mechanism for indicating on the forward dial plate the total gallonage dispensed by the pump. This means comprises, as shown in Figure 2, a pair of spaced brackets 51 having rigid support on the bottom wall of the casing 21 and rotatably supporting the shaft 52 having at its end a bevel gear 53 which meshes with the bevel gear 54. The bevel gear 54 is rigidly secured to the outer and lower end of the inclined shaft 55 which has likewise rigidly secured to its upper and inner end a bevel gear 56 which meshes with a gear 57 rigidly secured to the righthand end of the shaft 43 (Fig. 2).

Mounted on the shaft 52 between the brackets 51 are a plurality of indicator drums which are suitably driven in conventional manner from the shaft 52 so that the righthand drum must rotate ten revolutions to cause one revolution of the second, and the second must rotate ten revolutions to cause one full revolution of the third, while the third must rotate ten revolutions to cause one full revolution of the fourth, the fourth must rotate ten full revolutions to cause one full revolution of the fifth, and the fifth must rotate ten full revolutions to cause one full revolution of the sixth. The righthand drum, therefore, registers gallons in tenths, the second in units, the third in tens, the fourth in hundreds, the fifth in thousands, and the sixth in tens of thousands.

In order that the grand total of the machine may be obscured for a purpose which will hereinafter more clearly appear, the masking plate 51a is provided, which is normally disposed over that portion of the indicating dials which are aligned with the side aperture in the front indicator plate. This masking plate 51a is provided with suitable controls (Figs. 2, 4 and 5) which are provided for occasional operation only so that inspectors may have access to the grand total, according to the principles of this invention.

It will thus be seen that when the hose nozzle is supported on the outer end 10 of the hose hook lever 9, the motor 17 will be inoperative, as will also the pump, and that when the outer end 10 of the hose hook 9 is manually swung upwardly, the motor 17 is started to cause operation of the pump and, concurrently therewith, of the meter 35. Rotation of the shaft 36 of the meter 35 will be transmitted, as above described, through shaft 43, pinion 47 and gear 48, to cause the amount dispensed by the pump to be registered by the respective indicator drums 32, 33 and 34, while at the same time the shaft 52 will be rotated to register on the front dial of the pump the total gallonage pumped by the pump since its installation.

As shown particularly in Figure 2, the cam bar 104 which is suitably guided for vertical reciprocating movement in the casing 24 has an upper loop portion which is offset (to the right in Figure 2) from the lower portion thereof, which lower portion, at its lower end, has thereon a pintle member 105 to which is pivotally secured the outer end of the lever 106 which has its other or inner end rigidly secured to the rock shaft 107.

The rock shaft is pivotally supported at one end by suitable bearing means formed in the inner wall of the casing 24 and at the other end by bracket means 108 secured to the lower side of the indicator casing 21 (Fig. 2). At the end of the rock shaft 107, opposite that to which the lever 106 is secured, is rigidly secured the arm 109 which has a hook portion at its outer end disposed in the inner forked extremity 14 of the pump hook lever 9.

In Figure 2, the parts are shown in the position taken when the hose nozzle is supported by the outer end 10 of the pump hook lever 9. The corresponding position of the hose hook lever 9 is indicated in full lines in that figure. When the outer end of the hose hook lever 9 is swung upwardly, as above described, to initiate operation of the pump, the hose hook lever will take the dash line position shown in Figure 2, whereby the arm 109 and lever 106 will be swung rearwardly, as seen in Figure 2, or in clockwise direction to cause the cam bar 104 to be moved downwardly. Naturally, when the hose nozzle is replaced on the outer end 10 of the hose hook lever 9, the hose hook lever 9 will be swung from the dash line position of Figure 2 to the full line position therein, whereby the cam bar 104 will be reciprocated upwardly to the original position, as shown in Figure 2.

The resetting apparatus which provides connection between the reset shaft 18 and the indicator drums is actuated through the shaft 141 which is rotatably supported by the walls 23 and 23a of the casing 22. This shaft 141 extends rightwardly (Fig. 3) to a point adjacent the wall 26 of the casing 24, where it passes through a boss 142 on the wall 23.

Figure 22:
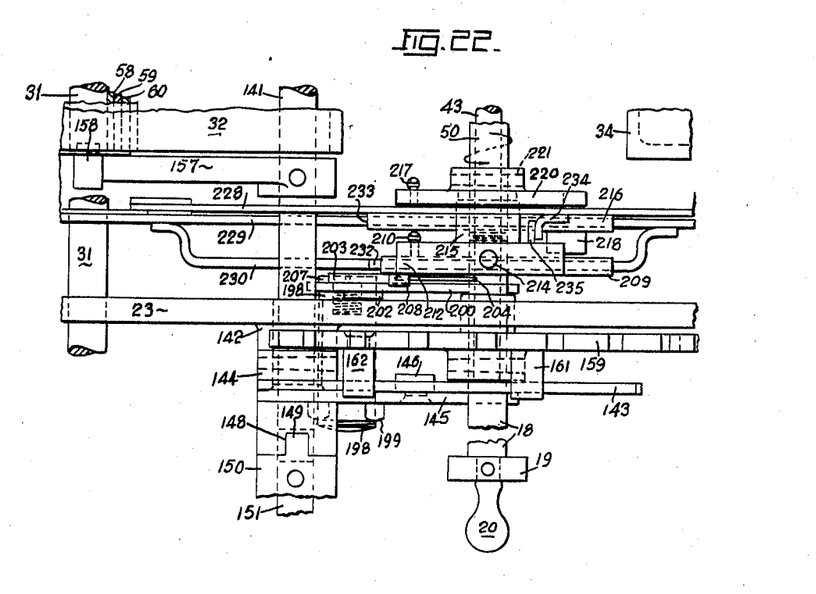
Figure 22 is a plan view taken along the center portion of Figure 4.
Figure 23:
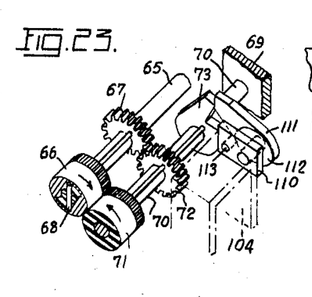
Figure 23 is an enlarged view of the printing mechanism.
Figure 24:
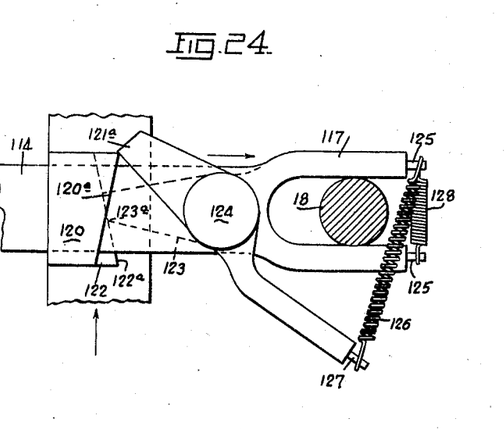
Figure 24 is a view showing in detail a portion of the actuating mechanism associated with the shaft 18 of Figures 4 and 22.

Rigidly fixed to the side of the plate member 145 is a connector member 147 which is substantially cylindrical and provided at its outer side with a transverse, or radial groove 148 into which extends the tongue 149 of the coupling member 150 having pinned thereto the shaft 151 which extends through a boss 152 in the wall 26 and has pinned thereto the cylindrical boss 153 which is rigid on the link member 154 (Figs. 2, 21 and 22).

Pivotally secured to the outer end of the link 154 is one end of the link 155 which has its opposite end pivotally secured at 156 to the vertically reciprocable cam bar 104. As shown in Figures 21 and 22, vertical reciprocation of the cam bar 104 will be translated, through links 154 and 155, to oscillation of the shaft 151 and the substantially triangular plate 145.

Pinned to the shaft 141, adjacent each indicator drum, is a stop arm 157. These stop arms 157 are all identical and are similarly disposed with respect, each to its adjacent drum, as shown in Figure 3. The stop arms are each adapted, when the pump is inoperative and the cam bar 104 is in uppermost position, as shown in Figure 2, to have their extreme ends disposed directly in the path of abutments 158 which extend axially outwardly from the peripheral flanges on the respective indicator drums.

As may be readily seen from Figure 3, the forward indicator drums 32, 33 and 34 only are provided with abutments 158 for cooperation with the adjacent stop arms 157 on the shaft 141 which is properly disposed in the casing 22 to provide the desired location of the stop arms 157 for cooperation with the abutments 158. Pinned to the reset shaft 18 is a reset gear 159 which meshes with a gear 160, which is pinned to the above-described shaft 30 which is supported for free rotation in the walls 23 and 23a for providing support for the rearmost indicator drums 32, 33 and 34 (Figs. 3 and 4). The reset gear 159 has rigidly secured thereto, the first stop 161 which is disposed substantially closely with respect to the reset shaft 18 and the second stop 162 which is disposed a greater distance from the shaft 18 and which is sufficiently arcuately spaced from the first stop 161 to permit engagement of the first stop 161 with the upper surface of the arm 143 to be followed by engagement of the second stop 162 therewith.

The rear indicator drums 32, 33 and 34 are similarly mounted with respect to the shaft 30, but transfer gearing is provided between the rear indicator drum 32 and the rear indicator drum 33, and between the rear indicator drum 33 and the rear indicator drum 34. The indicator drums each having substantially cup-shaped shells with the flanges thereof directed toward the left, as seen in Figure 3, as described in application Serial No. 190,772, filed February 15, 1938.

According to the principles of this invention, it is merely necessary to utilize transfer gearing between the drum 32 and the drum 33 and between the drum 33 and the drum 34 in the rear of indicator drums and in the rear bank only thereof. According to the construction illustrated, we have obviated the necessity for use of additional transfer gearing by provision of means whereby the drum 32 of the front bank is driven positively from the drum 32 of the rear bank, and whereby the corresponding drum 33 of the front bank is driven positively from the drum 33 of the rear bank, and whereby the drum 34 of the front bank is driven positively from the drum 34 of the rear bank.

The means for providing positive drive connection between the corresponding drums 34 comprises a sleeve 192 having rigidly secured to opposite ends thereof identical gears 193, one of which meshes with the gear 165 rigid on the drum 34 of the rear bank, and the other of which meshes with the gear 165 rigid with the drum 34 on the front bank of indicator drums. The sleeve 192 is freely rotatable on the above described shaft 50.

Superposed on and freely rotatable on the sleeve 192 is a sleeve 194 which has rigidly attached to each end thereof a gear 195. One gear 195 meshes with the gear 163 fixed to the other drum 32 of the rear bank, while the other gear 195 meshes with the gear 163 fixed to the drum 32 of the front bank. Advancement of one of the drums 32 is, therefore, accompanied by similar advancement of the other drum 32 (see Fig. 3). Supported for free rotation on the sleeve 194 is a third sleeve 196 which has a gear 197 rigidly attached to each end thereof. One gear 197 meshes with the gear 164 which is rigid with the drum 33 of the rear bank, while the other gear 197 meshes with the gear 164 which is rigid with the drum 33 of the forward bank. Therefore, the drum 32 of the forward bank is positively driven from and maintained in synchronism with the drum 32 of the rear bank.

Likewise, the drum 33 of the forward bank is positively driven from and maintained in synchronism with the drum 33 of the rear bank and the drum 34 of the forward bank is positively driven from and maintained in synchronism with the drum 34 of the rear bank. These drums are all driven by the shaft 36 of the meter 35 from the shaft 40 through bevel gears 41 and 42, shaft 43, clutch mechanism 44, shaft 45, pinion 47 and gear 48. The gear 48 drives the gear 182 which is rigid with the drum 32 of the rear bank and its attached gear 163, and the gear 163 through the lefthand gear 195 (Fig. 3), sleeve 194, and the righthand gear 195 drives gear 163 and the rigidly secured drum 32 of the forward bank.

The drive of the drum 33 of the rear bank is accomplished through the transfer disk 183, transfer tooth mechanism 185 and lefthand transfer tooth mechanism 185 and lefthand transfer gear 189 to the gear 166 and to ratchet 167 and from the drum 33 of the rear bank, the drive continues through the righthand gear 197, the sleeve 196, the lefthand gear 197 and the gear 164 to the rigidly attached drum 33 of the forward bank. The drive from the drum 33 of the rear bank continues through the transfer disk 184 and associated transfer gearing to the drum 34 of the rear bank and thence through the rigidly attached gear 165, the meshing righthand gear 193, the sleeve 192 and lefthand gear 193 to the gear 165 and rigidly attached drum 34 of the forward bank.

Shutter means is provided for obscuring the indicator means of the pump, at certain times, to prevent fraudulent operation thereof. This means becomes operative when, after a fuel dispensing operation, attempt is made to perform a second dispensing operation without resetting the indicator means to zero. This makes obligatory the performance of the resetting operation subsequent to each dispensing operation in order that the indicator means shall, thereafter, be visible. The closed position of the shutter means provides warning of this failure to reset the indicator means and prevents guidance of the operator, by the indicator means, in the performance of a further dispensing operation without properly resetting the indicator means to zero reading in order that it may register the exact quantity delivered.

The substantially triangular plate member 145 and its connection with the shaft 141 is described above. As also described above, when the outer end 10 of the hose hook lever 9 is swung upwardly, the substantially triangular plate member 145 is likewise swung upwardly. This upward movement of the triangular plate member 145, when the outer end of the hose hook lever 9 is raised to initiate operation of the pump, is utilized in the following manner for controlling the shutter means of the pump, as described above.

The shutter control means is best illustrated in Figures 4 and 6 to 20, inclusive. Secured to the lower corner portion of the plate member 145 by means of the nut 199 is a stud member 198, which has pivotally secured thereto the slide member 200. This slide member 200 is provided at its upper end with a longitudinal slot 201 which extends over the above-described shaft 43. Pivotally secured to the slide member 200 by means of the shoulder rivet 202 is a cam plate 203 which is biased in counterclockwise direction (Fig. 17) by the spring member 204 which has its lower end in engagement with a side of the cam plate 203 and its upper end secured on a pin 205. The cam plate 203 has an angular notch 206 at its right side, as seen in Figures 6 to 10 and 17 to 20 inclusive, which divides the cam plate 203 into two substantially triangular portions. The lower portion has its lower edge in engagement with the head of a screw 207, by means of which the slide member 200 is pivotally secured to the stud 198.

This engagement limits counterclockwise movement of the cam plate 203 under the influence of spring 204. The upper end of this cam plate 203 is adapted for engagement with a pin 208 secured to the upper corner of the end portion of a front pawl member 209 which is pivotally supported on the above-described shaft 43 and urged in counterclockwise direction thereon by means of a spring 210. At its upper end, the pawl 209 is provided with an arcuate portion 211 which is adapted for engagement with a front cam member 212 rigidly secured to the reset shaft 18 and which is provided with a peripheral notch 213 which receives the arcuate head portion 211 of the pawl 209 in the "at rest" position thereof. The front cam member 212 is suitably secured to the reset shaft 18.

The shaft 43 also pivotally supports a back pawl member 216 which is of substantially the same shape as the front pawl member 209, but which has the lower end thereof extending beyond the corresponding end of the front pawl member 209. A spring 217 corresponding to the spring 210 biases the front pawl member 216 in counterclockwise direction about the shaft 43, as seen in Figures 11 to 15. At its upper end, the back pawl 216 is provided with a transverse cylindrical head member 218 which is adapted to cooperate with the back cam member 220 which has therein a peripheral notch 219 similar to the notch 213 of the front cam member 212.

Figure 7:
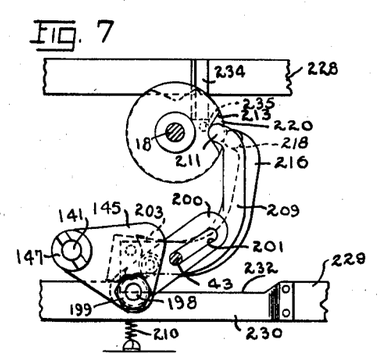
Figure 7 is a view similar to Figure 6, but showing the parts in the position taken during the delivery of fuel by the pump.

As shown in Figure 7, the transverse head member 218 of the back pawl 216 extends forwardly sufficiently for engagement with the notch 213 in the front cam 212 as well as the notch 219 in the back cam member 290. The back cam member 220 is suitably pinned to the shaft 50 which, as above described, is driven through gearing from the shaft 36 of the meter 35 (Figs. 2 and 4).

Figure 5:
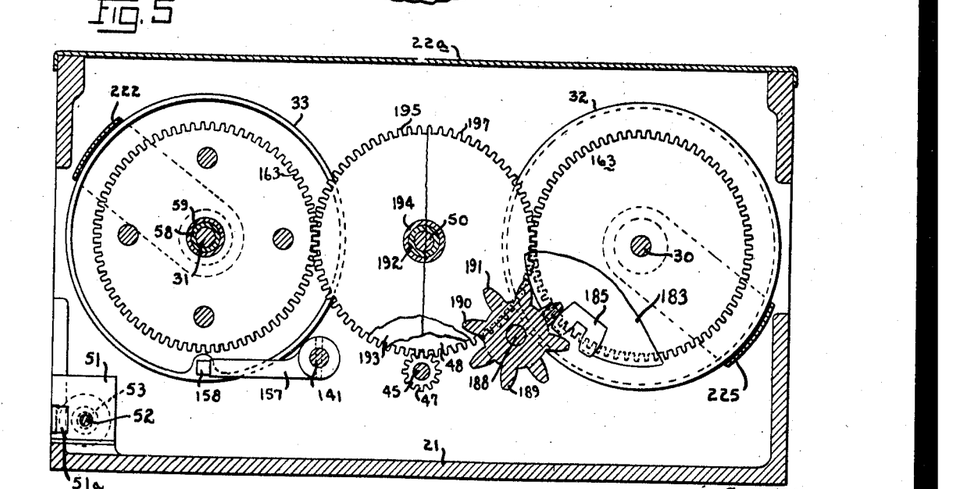
Figure 5 is a section taken substantially on the line 5—5 of Figure 3.

The front shutter member comprises a substantially U-shaped plate member 222 which is pivotally supported at one end by the shaft 31 and at the other end by the outer sleeve 60, as shown in Figures 2, 4 and 5. At this latter end, the plate is provided with a substantially elongated downwardly extending arm 223 and a short upwardly extending arm 224. The rear shutter member 225 is likewise of U-shape being provided with a substantially elongated downwardly extended arm 226 similar to the arm 223 of the front shutter member 222 and with a short upwardly extending arm 227 similar to the above described arm 224 of the front shutter member 222. The arms 224 and 227 are each pivotally secured to opposite ends of the shutter setting link 228, while the arms 223 and 226 are pivotally secured to opposite ends of the shutter latching bar 229 which has rigidly secured thereto the forward shutter latching bar member 230 which, as shown in Figure 4, is substantially parallel thereto.

As shown in Figure 4, the shutter member 222 is constantly urged downwardly by means of the tension spring 231 which is secured at one end thereto and at the other end to the casing. In the position shown in Figure 4, the shutter members 222 and 225 are withdrawn from obstructing position with respect to the indicator drums for full vision of the respective indicator drums. The parts are maintained in that position by cooperation of the lower ends of the front and back pawl members 209 and 216 with suitable notches provided in the members 229 and 230.

As shown particularly in Figures 6 to 10 inclusive, the forward latching bar member 230 is provided with a notch 232 which has its right end inclined upwardly and its left end terminating in a vertical wall. This notch 232 cooperates with a front pawl member 209 in such manner that, when the lower end of the pawl member 209 is disposed in the notch 232, abutment of the lower end of the pawl 209 with the left end of the notch 232 will prevent further rightward movement of the forward latching bar member 230. The force of the spring 231 is always transmitted to the forward latching bar member 230 in such manner as to constantly urge it to the right. Thus, when the front pawl member 209 has its lower end disposed in the notch 232, it prevents the spring 231 from thrusting the member 230 to the right after engagement of the pawl 209 with the left end of the notch 232.

Figures 10, 14, 15:
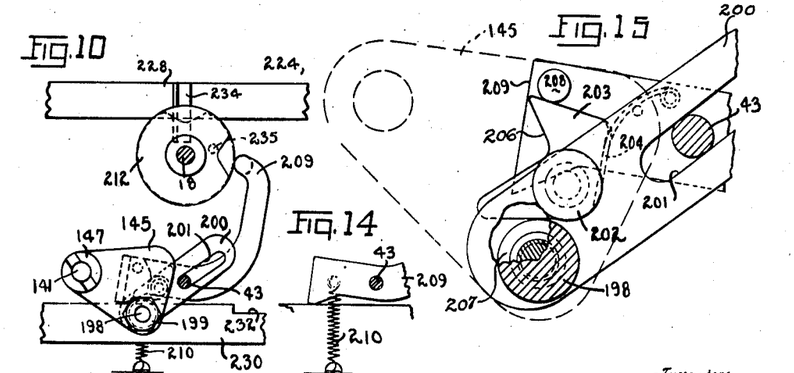
Figure 10 is a view similar to Figure 8, but showing the parts in the position taken subsequent to the position of Figure 1, when resetting (Fig. 9) is omitted and the hose hook is manually raised preparatory to a second delivery of fuel without resetting of the indicator means to zero reading.
Figure 14 is a fragmentary detail view, in elevation, of structure shown in Figures 6 to 10.
Figure 15 is an enlarged fragmentary detail view of structure shown in Figures 6 to 10, inclusive, showing the parts in a position intermediate the starting position (shown in Figure 4) and the position shown in Figure 6.
Figure 11:
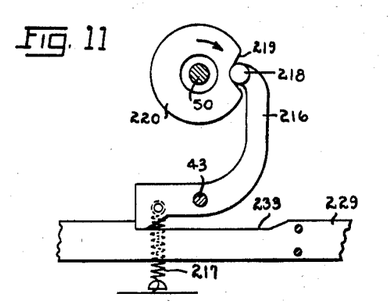
Figure 11 is a simplified diagrammatic view of a portion of the shutter operating means illustrated in Figures 6 to 10, inclusive, showing mechanism which is obscured by that shown in Figure 6, with the parts in the position illustrated in that figure.

The shutter latching bar 229, as shown in Figures 11 to 15 inclusive, is provided with a similar notch 233 which has its left end in alignment with the left end of the notch 232. When the lower end of the back pawl member 216 is disposed in the notch 233, as shown in Figure 11, further rightward movement of the member 229, under the influence of spring 231, is prevented. As pointed out above, the members 230 and 229 are rigidly secured together.

Means responsive to the resetting operation for opening the shutter members 222 and 225, after they have been closed, comprises the angle 234 which is rigidly secured to the shutter setting link 228 and which cooperates with a setting pin 235 rigidly fixed to the front cam member 212, as shown in Figures 6 to 10 inclusive.

Clockwise rotation of the back cam member 220 is caused, during fuel delivery, through rotation of the shaft 50 which is driven from the meter 35, as above described. Clockwise rotation of the front cam member 212 is achieved, during resetting, by like manual rotation of the resetting shaft 18.

When the parts are in the position shown in Figure 4, full visibility of the drums 32, 33 and 34 of each bank is provided, the shutters being held open by engagement of the longer end of the back pawl member with the left end of the notch 233 in the shutter latching bar 229. When the hose hook is manually thrust upwardly, as above described, the plate member 145 will be swung upwardly from the position shown in Figure 4 to that shown in Figure 6.

During the upward movement of the plate member 145, the upper triangular end of the cam plate 203 will abut with the pin 208 which is rigid with the end of the front pawl 209, whereby the lower end of the pawl 209 will first be drawn upwardly and then again released after passage of the upper end of the cam plate 203 past the pin 208, whereby the lower end of the pawl 209 will be disposed in the notch 232. Although the lower end of the pawl 209 is disposed in the notch 232, it does not abut the left end of the notch because of the engagement, as shown in Figure 11, of the lower end of the back pawl 216 with the left end of the notch 233.

Figure 6:
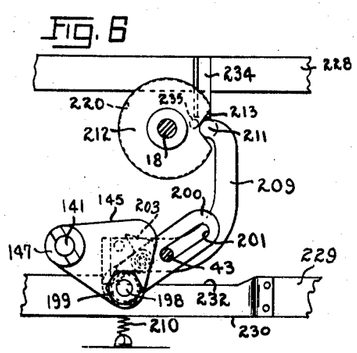
Figure 6 is a simplified diagrammatic view of the shutter operating means, shown in the starting position in Figure 4, with the parts in the position taken immediately after the hose hook is manually raised to initiate fuel delivery by the pump.
Figure 12:
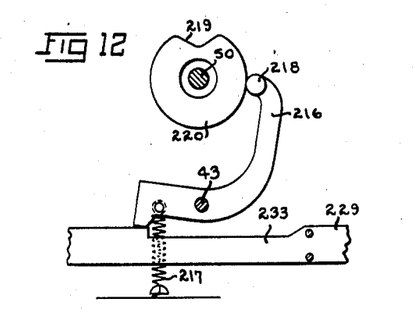
Figure 12 is a view similar to Figure 11, but showing the illustrated parts in the position of Figure 7.
Figure 13:
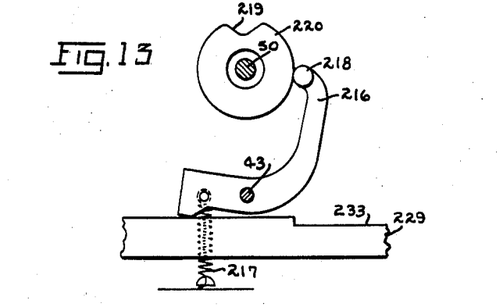
Figure 13 is a view showing the illustrated parts in the position of Figure 9.
Figure 16:
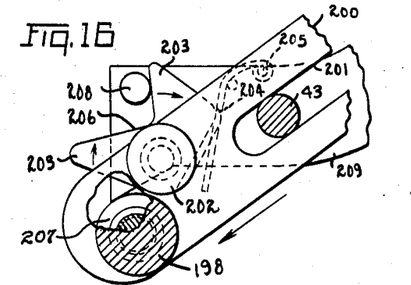
Figure 16 is a view similar to Figure 15 but showing the parts in a position taken intermediate the position of Figure 7 and that of Figure 8.

The parts will then take the position shown in Figures 6 and 11, and during delivery by the pump, the shaft 50 and its rigidly attached back cam member 220 will be rotated in clockwise direction, as shown by comparison of Figures 11 and 12. This causes the notch 219 to pass the head 218 of the back pawl member 216 to swing the member 218 outwardly with respect to the cam and to raise the lower end of the pawl 216 out of the notch 233. The position of the pawl 216 with respect to the notch 233, is shown in Figure 12, and as shown in Figure 7 at that time, the lower end of the front pawl member 209 will be engaging the left end of the notch 232. Thus, the shutters will be held open by the front pawl member 209.

Figure 8:
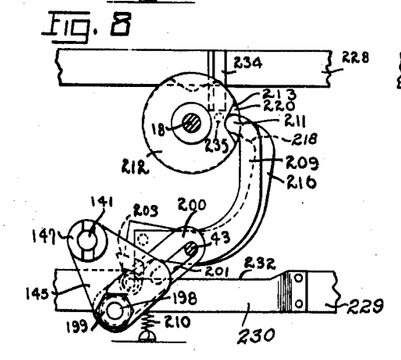
Figure 8 is a view similar to Figure 7, but showing the parts in the position taken after the hose is returned to the hose hook.
Figure 17:
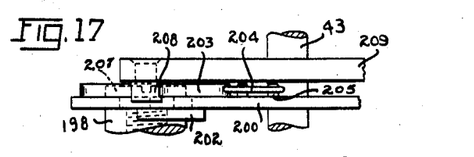
Figure 17 is fragmentary plan view of the structure shown in Figure 16.
Figure 18:
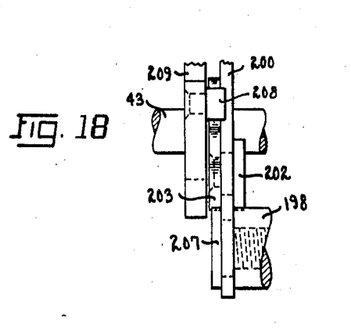
Figure 18 is a fragmentary view, in elevation, of the structure shown in Figure 16, as seen from the left of Figure 16, looking toward the right.

The rotation of the shaft 50 and cam 220 continues during delivery by the pump without in any wise affecting the position of the shutter mechanism, and upon completion of the dispensing operation the hose hook is moved downwardly by placing the hose nozzle thereon, whereby to swing the plate member 145 downwardly to the position shown in Figure 8. This downward movement of the plate member 145 downwardly to the position shown in Figure 8. This downward movement of the plate member 145 will cause the cam plate member 203 to swing in clockwise direction against the spring 204 in the direction indicated by the arrows in Figure 18 so that the upper end of the cam plate 203 may move down under the pin 208, as shown in Figure 17. The parts are then in the position shown in Figures 8 and 13, and the shutters are still held open by engagement of the lower end of the front pawl 209 in the notch 232. Thereafter, if the resetting operation is carried out, rotation of the resetting shaft 18 in clockwise direction will cause like rotation of the front cam member 212 to move the upper end 211 of the front pawl member 209 out of the peripheral notch 213 of the front cam member 212.

Figure 9:
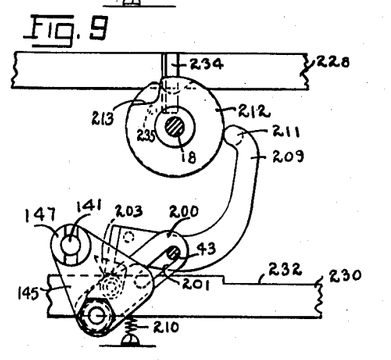
Figure 9 is a view similar to Figure 8, but showing the parts in the position taken during resetting of the indicator means.

As shown in Figure 9, the lower end of the front pawl member 209 will be moved upwardly out of the notch 232, whereby the spring 231 is permitted to cause the latching bar members 229 and 230 to be thrust to the right to cause the shutters to be closed. This closing of the shutters is continued until closely adjacent the end of the full revolution of rotation of the front cam member 212, during resetting, the setting pin 235 engages the angle 234 to thrust the shutter setting link 228 to the right against the force of the spring 231 to open the shutters, just prior to, and substantially simultaneously with, completion of the resetting operation.

At this time the notch 213 in the front cam member 212 will be so disposed with respect to the front end 211 of the front pawl 209 as to permit the lower end of the pawl 209 to fall into the notch 232, whereby to latch the shutters open. This completes a cycle of operation when the resetting operation is properly accomplished by the operator to return the indicator drums of the pump to a proper zero reading, and thus prepare the pump mechanism for a further dispensing operation.

As above described, the upper end of the cam plate 203 is disposed, as shown in Figure 17, below the pin 208, and the simultaneous upward movement of the plate member 145 and the hose hook will cause the cam plate 203 to swing the lower end of the front pawl 209 upwardly out of the notch 232 to release the latching bar members 229 and 230 and permit the shutters to close. In this case the second fuel dispensing operation, which is attempted to be accomplished without resetting, will be a blind fuel dispensing operation, because the shutters will be closed and the operator may not observe the indicating mechanism of the pump.

It will thus be seen that where resetting has not been accomplished, the shutter mechanism is so arranged that the shutters will be closed subsequent to completion of a first fuel dispensing operation, through manual movement of the hose hook upwardly, and consequent upward swinging movement of the plate member 145. Otherwise, the shutter mechanism is closed during the resetting operation, as shown in Figures 9 and 14, until immediately subsequent to completion of the resetting operation, the resetting pin 235 engages the angle member 234 to open the shutters and permit the pawl members to cooperate with the latching bar members 229 and 230 to latch the shutter mechanism open preparatory to a further operation of the pump.

If, after completion of a dispensing operation, resetting is not accomplished, then immediately upon removal of the hose nozzle from the hose hook and the manually accomplished upward movement of the hose hook, the shutters are automatically closed in such manner as to prevent observation of the indicator mechanism until the shutters are reopened through the proper accomplishment of the resetting operation, as above described.

It will thus be seen that the mechanism is so arranged that when the resetting operation has been properly accomplished, the shutters are opened to provide full vision of the pump indicator mechanism.

It will be understood that the above described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In combination in a fuel dispensing pump including fuel dispensing means, a rotary drum for indicating the quantity of fuel dispensed, a hose hook supporting lever means for controlling the operation of said dispensing means, resetting means for resetting said rotary drum to zero reading prior to a dispensing operation, shutter means associated with said drum adapted when closed to obscure the readings on said drum, and shutter control means including a vertically moving triangular plate member, said means being responsive to said resetting means and said hose hook supporting lever means, and operative automatically through said triangular plate member upon operation of said hose hook supporting lever for initiating a dispensing operation, without previous operation of said resetting means to close said shutters and maintain them closed until subsequent operation of said resetting means.

2. In combination in a fuel dispensing pump including fuel dispensing means, a rotary drum for indicating the gallonage of fuel dispensed, a hose hook supporting lever means for controlling the operation of said dispensing means, resetting means for resetting said rotary drum to zero reading prior to a dispensing operation, shutter means associated with said drum adapted when closed to obscure the readings on said drum, said shutter control means including a vertically movable member, means connecting said hose hook supporting lever to said vertically moving member whereby when the hose hook lever is raised to initiate operation of said pump said vertically moving member is operated, and means connected to said vertically moving member for operating said shutter control means to close said shutters.

3. In combination in a fuel dispensing pump including fuel dispensing means, a rotary drum for indicating the quantity of fuel dispensed, hose hook supporting lever means for controlling the operation of said dispensing means, resetting means for resetting said rotary drum to zero reading prior to dispensing operation, shutter means associated with said drum adapted to obscure readings on said drum, and shutter control means including a vertically moving member, means connecting said hose hook to said vertically moving member, and latching means also connected to said vertically movable member and operated thereby for latching said shutters in open position during the fuel dispensing operation, and means for releasing said latch members connected to said vertically movable member whereby upon completion of the dispensing operation and opposite movement of said hose hook said latching means is released and said shutters are closed.

4. In combination in a fuel dispensing pump including fuel dispensing means, a rotary drum for indicating the quantity of fuel dispensed, a hose hook supporting lever, means for controlling the operation of said dispensing means, resetting means for resetting said rotary drum to zero reading prior to a dispensing operation, shutter means associated with said drum adapted when closed to obscure the readings on said drum, means for latching said shutters in closed position, and means operated by said resetting means for releasing said latching means to permit full vision of said rotary drum.

5. In combination in a fuel dispensing pump including fuel dispensing means, a rotary drum for indicating the quantity of fuel dispensed, a hose hook lever, means for controlling the operation of said dispensing means, resetting means for resetting said rotary drum for zero reading prior to a dispensing operation, shutter means associated with said drum adapted when closed to obscure the readings on said drum, and shutter control means including a vertically moving triangular plate member, and means connecting said plate member to said hose hook and to said shutter means whereby when said hose hook is moved by placing the hose nozzle thereon said plate member is swung downwardly to cause the partial release of said shutter member, and means operated by said resetting mechanism for completing the release of said shutter member.

6. The combination in a fuel dispensing pump including fuel dispensing means, a rotary drum for indicating the quantity of fuel dispensed, hose hook supporting lever means for controlling the operation of said dispensing means, resetting means for resetting the rotary drum to zero reading prior to a dispensing operation, shutter means associated with said drum adapted when closed to obscure the readings of said drum, and shutter control means including a vertically movable member connected to said hose hook supporting lever and said resetting mechanism whereby upon the operation of said hose hook supporting lever means followed by the operation of said resetting means, said shutter control means is operated to open said shutters.

7. The combination in a fuel dispensing pump including fuel dispensing means, a rotary drum for indicating the quantity of fuel dispensed, a hose hook supporting lever means for controlling the operation of said dispensing means, resetting means for resetting said rotary drum to zero reading prior to a dispensing operation, shutter means associated with said drum adapted when closed to obscure the reading on said drum, shutter control means including a vertically movable triangular plate member, and a cam plate member operated by said triangular plate member for initiating the release of said shutters by operating said shutter control means, and means operated by said releasing means for completing the release of said shutters.

EARL E. EICKMEYER.
ANTHONY G. HORVATH.